Dec. 22, 1959  D. F. BROWER ET AL  2,918,666
CONDITION RESPONSIVE ELECTRICAL SYSTEM
Filed July 30, 1956
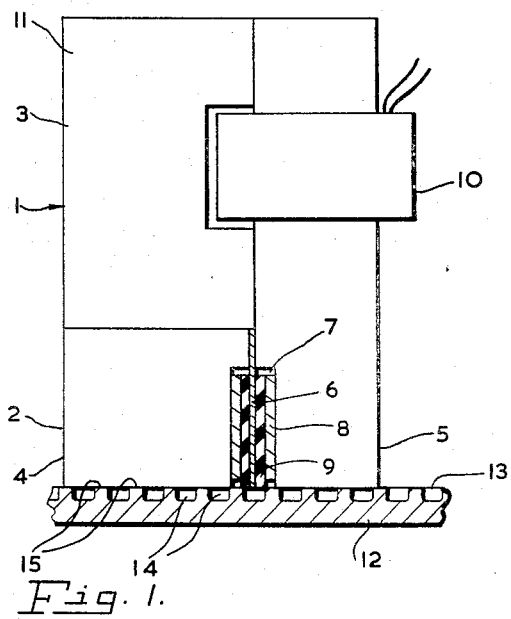
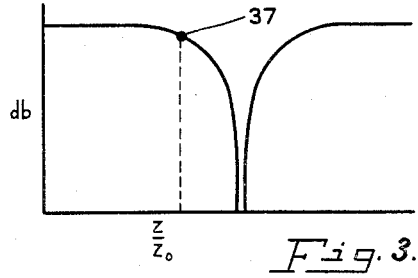
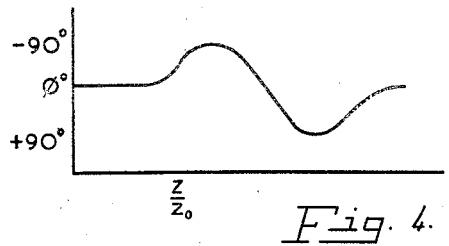
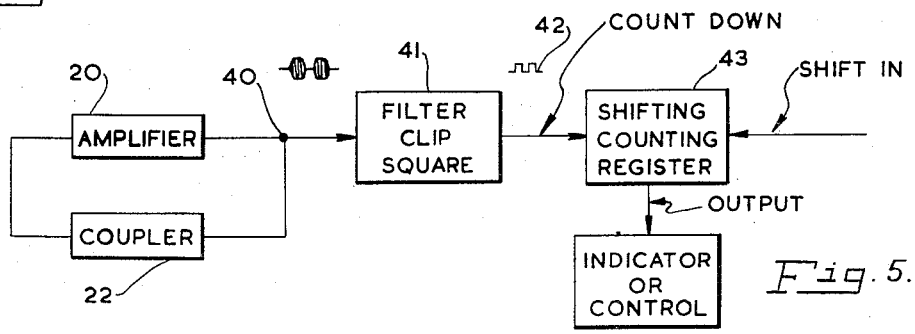
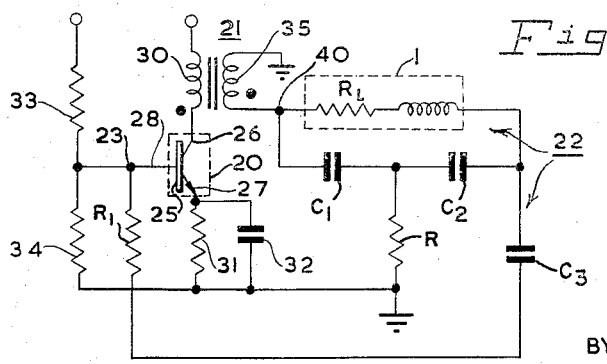
DAVID F. BROWER,
WILLIAM T. CHATER,
INVENTORS
BY 
ATTORNEY

United States Patent Office 2,918,666
Patented Dec. 22, 1959

---

2,918,666

CONDITION RESPONSIVE ELECTRICAL SYSTEM

David F. Brower, Torrance, and William T. Chater, El Segundo, Calif., assignors to Hughes Aircraft Company, Culver City, Calif., a corporation of Delaware Application July 30, 1956, Serial No. 600,838

2 Claims. (Cl. 340—195)

This invention relates generally to condition responsive electrical systems and more particularly to systems of this general type wherein the variation of the electrical characteristics or electrical state of a condition response electrical element are utilized to effect marked changes in the electrical state of the system embodying such elements.

For the purposes of illustration, and without limitation, this invention is embodied in an arrangement applicable to the detection and/or measurement of physical displacement. It will be appreciated, however, that this represents but one of numerous applications involving electrical transducers capable of producing changes in electrical state in dependence of a physical condition.

The application of digital type circuits in control systems requires condition sensitive arrangements capable of producing electrical outputs of "binary" character, that is, of either one value or another in dependence of predetermined increments of magnitude of the physical condition under investigation. Arrangements of this general type differ in elementary principle from proportional types in that approximately repetitive changes in electrical state of the system with incremental variations of the condition are necessary to obtain the binary or cyclic characteristics of response.

In connection with displacement or position measuring arrangements, a device of the type disclosed in a copending application of D. F. Brower, Serial No. 588,711, entitled "Variable Reluctance Electromagnetic Device," filed June 1, 1956, and assigned to the assignee of this invention, is suitable for use as the displacement sensitive transducer in a system of the type herein disclosed.

In a copending application of the applicant, Serial No. 595,256, entitled "Bridge Circuit for Position Measuring Device," filed July 2, 1956, and assigned to the assignee of this invention, an incremental displacement or position detector system is described employing the transducer described in the aforesaid application of D. F. Brower in an alternating current circuit arrangement having sharp response characteristics to changes in the electrical condition of the transducer with small increments of displacement. The advantages of such an arrangement in digital systems inhere from the critical sensitivity of the circuit arrangement to the electrical variable of the transducer.

A type of binary response to incremental changes in physical conditions which is desirable for most applications, is that wherein the circuit or electrical system response alternates between zero and a predetermined transmission level of sufficient magnitude to drive connected devices without intermediate amplification. This affords substantially infinite ratio between the electrical condition states of the circuit. Previous arrangements, while approaching this ideal under some conditions, ordinarily provide about a 10 to 1 ratio between the electrical states after adjustment for best signal to noise ratio.

An object of this invention is to provide a condition responsive circuit arrangement suitable for application in digital types of systems, which is simple and positive in operation.

Another object of this invention is to provide a digital type of condition responsive electrical system affording a substantially infinite ratio between its two electrical condition states.

Specifically stated, it is an object of this invention to control an oscillator circuit between oscillating and non-oscillating states in dependence of incremental changes in a physical condition.

In connection with the preceding object, it is an object hereof to provide an electrical system for determining the magnitude of a physical condition.

These and other objects and advantages will become apparent from a study of the following disclosure when considered in conjunction with the accompanying drawing, in which:

Fig. 1 is an elevational view, fragmentarily in section, of an incremental displacement detector applicable in practicing this invention;

Fig. 2 diagrammatically illustrates an electrical system embodying the principles of this invention;

Figs. 3 and 4 are curves depicting electrical characteristics of the system of Fig. 2; and Fig. 5 is a block diagram of a type of digital system for determining the magnitude of a controlling condition of the system of Fig. 2.

The application of digital principles in systems responsive to physical conditions requires electrical transducers operable between two substantially repetitive electrical states with predetermined incremental changes in the physical condition. A device in this general category for detecting incremental displacement is shown in Fig. 1, and is described in detail in the aforesaid application of D. F. Brower. Only such description of the device will be made herein as is necessary to obtain an understanding of the present invention.

To this end a variable impedance arrangement such as illustrated in Fig. 1 may be provided for producing impedance variations between two impedance states for successive increments of physical displacement. The arrangement illustrated in Fig. 1 embodies an electromagnetic detector head generally designated 1, being comprised of substantially independent magnetic circuits 2 and 3. Magnetic circuit 2 is a 3-pole arrangement being comprised of outer pole legs 4 and 5 and a smaller central pole leg 6. A suitable cavity 7 is provided on each side of the central pole leg in the assembly, as shown, to receive a single turn coil 8 of a thin electrical conducting foil, such as silver foil, which is wrapped about the center pole 6 over a suitable thin sheet of electrical insulating material 9. As will be seen by reference to Fig. 1, the outer pole legs 4 and 5 are relatively large as compared with the center pole leg 6. If these outer pole legs are made of electrical insulating magnetic material such as ferrite they need not be insulated electrically from coil 8.

The single turn coil 8, herein referred to as the detector coil, is transformer coupled (the inductive coupling arrangement not being shown) to a coil 10. Coil 10 is disposed about an extension of the core leg 5, and the magnetic circuit for the coil assembly is completed by the U-shaped magnetic core section 11, the legs of which bracket the winding 10 and seat against the sides of the extension of the pole 5.

The bottom faces of legs 4, 5 and 6 of the three-legged magnetic circuit 2 terminate in a common plane. This may be accomplished by grinding, or by some other suitable operation. These pole faces slide along a scale 12 of magnetic material having a grooved surface 13 confronting the end of the pole faces and defining equally spaced lands 15 therebetween.

It will be noted by reference to Fig. 1 that the pole faces of the legs 4 and 5 are sufficiently wide to straddle a plurality of the grooves 14, and that the center leg 6 defines a pole face having a width that is less than the width of a groove 14. This center leg therefore effectively functions as a magnetic probe presenting substantial air gap variations in the magnetic circuit upon relative movement of the scale, to provide marked reluctance changes in the magnetic circuit depending upon whether the center pole is over a groove or a land in the scale 12. These reluctance variations through the coupling in the magnetic circuit and through the transformer coupling between the coil 8 and the coil 10 result in marked inductance or impedance changes in the coil 10 upon relative movement between the scale 12 and the detector head assembly. The characteristic of an impedance change through proper positioning of the center pole 6 with respect to the grooves and lands results in an impedance variation between two predetermined values which is substantially reproducible from groove to groove along the scale. Thus, with this arrangement, a positive indication is obtained of the relative position of the movable parts of the complete incremental displacement detector with respect to the grooves and the lands.

It is to be understood that this arrangement represents but one of numerous arrangements which may be utilized for the purpose indicated, all of which may be classified within the general category of variable impedance devices. In fact, it is conceivable that a suitable type of switching device, mechanically actuated by grooves of the same general nature as the scale 12, may be utilized to periodically shunt a suitable electrical impedance to achieve substantially the same purpose herein indicated. Modified devices and their applications in systems for the purpose of detecting incremental changes in physical conditions will of course depend to a large extent upon the degree of accuracy required in detecting displacement. In displacement sensitive arrangements where accuracies of the order of one mil or less are required, many mechanically actuated arrangements may prove impractical. However, these problems involve matters of degree only.

For the purpose of obtaining marked variations in electrical characteristics corresponding to the respective impedance states of a transducer, this invention contemplates the control of an oscillator circuit between oscillating and non-oscillating states, in dependence of impedance variations of a circuit including a coil, such as 10 of the transducer arrangement illustrated in Fig. 1. Although any suitable type of impedance sensitive circuit may be utilized for this purpose, a bridged-T type of network, one branch of which includes the coil 10 provides adequate control. This corresponds to a specific embodiment of the present invention, and is merely representative of one type of numerous impedance sensitive circuits which may be utilized for this purpose.

The circuit arrangement illustrated in Fig. 2 is of the form of a feedback oscillator embodying an amplifier generally designated 20, having a coupling transformer 21 in its output circuit providing the necessary feedback to an input circuit 23 for a given impedance state of a coupling circuit 22 to effect oscillation of the electrical circuit.

More particularly, the amplifier 20 is represented in a junction type of transistor 25 having a collector terminal 26, an emitter terminal 27, and a base terminal 28. This transistor has its collector and emitter terminals connected in an output circuit comprising primary winding 30 of transformer 21, which is connected to a supply of positive voltage, and which further includes the parallel connected resistor 31 and capacitor 32, which complete the output circuit to the other side of the power supply. Base terminal 28 is connected to a voltage divider circuit, including resistors 33 and 34 which are connected in series across a suitable supply of direct current. The voltage applied to the base terminal of the resistor from the voltage divider circuit biases the transistor to a normally conducting state. The transistor here used is biased for class A operation. Thus, the primary winding 30 of the transformer 21 normally carries direct current. Transformer 21 may be a step-down transformer having a predetermined turns ratio between the primary winding 30 and its secondary winding 35 to establish the required magnitude of feedback voltage for the oscillator. The secondary winding 35 supplies the coupling circuit 22 which includes the bridged-T network with the detector head 1 in one of its branches. The detector head is herein illustrated in dotted outline, and is electrically represented by a resistor $R_L$ and an inductor L, denoting the resistive and inductive properties of the electromagnetic coil assembly of the detector head. The detector head coil assembly is shunted by series connected capacitors $C_1$ and $C_2$, the common terminal of which is grounded through a resistor R. The secondary winding 35 of the transformer 21 also has one of its terminals grounded, and functions as the energizing source for the bridged-T network. The feedback loop is completed by the series connection of capacitor $C_3$ and resistor $R_1$, forming part of the coupling circuit, which connect to the base terminal 28 of the transistor.

The transmission characteristic of the bridged-T network, plotted against per unit impedance $$\left(\frac{Z}{Z_0}\right)$$

is approximately depicted in Fig. 3. $Z_0$ denotes the coil impedance producing maximum attenuation. This network will be recognized as a circuit commonly used as a single frequency rejection filter. This arrangement affords substantially infinite attenuation of an input signal at some predetermined frequency and exhibits sharp attenuation to frequencies on either side of the critical frequency. As a practical matter, this circuit may not exhibit the sharp cut-off characteristics indicated in Fig. 3, but may instead have a minimum db transmission magnitude about the critical frequency range, depending upon the resistive properties of the circuit and the Q of the inductors which form a part of the circuit. In general, however, this figure will serve to indicate the manner of behavior of the circuit.

As with any feedback type of oscillator, sustained oscillation depends upon the feedback of an electrical signal of proper magnitude and phase, which, with the gain of the amplifier, results in sustained oscillation at a frequency dictated by circuit parameters.

Unlike the application of the bridged-T network as a single frequency rejection filter, the network is controlled by varying the impedance of that circuit branch including the coil assembly of the detector head 1. This impedance variation, as earlier described, depends upon the disposition of the single pole 6 of the detector head with respect to a groove or a land. The characteristic phase shift of the voltage across the bridged-T network is approximately represented in Fig. 4, which is aligned with Fig. 3 to indicate the approximate phase of the voltage at the output side of the bridge circuit with respect to a particular point of operation on the transmission characteristic curve illustrated in Fig. 3. It will be seen from an inspection of the curves of Figs. 3 and 4, that the voltage phase shift across the bridged-T network may amount to 90° for two impedance magnitudes of the detector head assembly. If the circuit is adjusted for maximum attenuation when the center pole 6 is over a land, in which position the coil impedance is at its higher value, then positioning of the center pole 6 over a groove results in a drop in coil impedance which shifts the operation to a point 37 on the curve, increasing the circuit transmission and shifting the phase of the voltage at the output. By suitable selection of the circuit parameters including those of $C_3$ and $R_1$ and with due consideration of the time constant of the transistor 25, the feedback voltage may be adjusted as to phase and as to magnitude to obtain oscillation at the frequency determined by the circuit parameters. In one practical embodiment this was about one megacycle. Thus, the impedance variation of the detector coil assembly in the bridged-T circuit is effective in its high range to prevent oscillation and in its low range to initiate oscillation.

By similar reasoning maximum attenuation may be obtained for that value of coil impedance resulting from positioning of the center pole 6 over a groove. Shifting of the center pole 6 to a land then increases the coil impedance resulting in operation over the right-hand portion of the curve of Fig. 3. Oscillation can again be controlled substantially as described through adjustment of the circuit with due consideration for the reversal of phase shift of the bridge circuit.

It is to be understood that the curves of Fig. 3 and Fig. 4 are not intended to accurately depict electrical and operational characteristics for predetermined values of the circuit parameters, but are intended exclusively to indicate in a qualitative way the functional behavior of the circuit.

The control of the oscillator circuit by the detector head 1 may be viewed effectively as a switch which switches the oscillator between oscillating and non-oscillating states in dependence of changes in impedance of the coil assembly of the detector head, which impedance changes in turn depend upon the position of the center pole 6 of the detector head with respect to the grooved scale. Thus with realtive movement between the detector head and the scale, the oscillator is alternately switched between oscillating and non-oscillating states. The output of this circuit may be taken from a terminal 40 of the transformer secondary winding 35. The output at this point is characterized by bursts of electrical energy each time the oscillator is switched to its oscillating state. In its non-oscillating state the output at point 40 is effecively zero. The characteristic voltage, which is thus obtained, approaches a square wave voltage which varies between zero in the non-oscillating state of the oscillator and some predetermined magnitude in the oscillating state, depending upon the electrical capacity of the circuit. This voltage is therefore digitally indicative of the position of the detector head with respect to the scale.

The block diagram of Fig. 5 diagrammatically indicates the application of the circuit arrangement of Fig. 2 in an arrangement for determining the position of the detector head with respect to a reference point along the scale 12. For the purpose of convenience, this reference point may be regarded as the first groove along the scale, assuming relative movement of the detector head from left to right along the scale as viewed in Fig. 1. The characteristic output of the oscillator at point 40 in Fig. 5 is approximately indicated adjacent thereto. This output, if required, may be filtered, clipped and squared in conventional circuitry indicated by block 41, and in accordance with conventional practices, to produce a repetitive rectangular wave form approximately as indicated at 42 at the output of circuit 41.

This output may be applied to a shifting-counting register 43 of any conventional design, one type of which is illustrated in Fig. 3 of a copending application of William L. Exner et al., Serial No. 459,302, filed September 30, 1954, entitled "Broad Bandwidth Digital Servo" and assigned to the assignee of this invention. This register is capable of receiving a shift-in count which in this instance is indicative of a corresponding number of scale counts with respect to the scale 12. Thus, the shifting-counting register has applied to it information concerning a desired relative position between the scale and the detector head. The square waves which result from the aforesaid relative movement with respect to the beginning of the scale marks or grooves are applied to the count-down input of the shifting-counting register which counts down the contents of the register until a zero count remains in the register. At this point, the desired relative position between the movable parts of the incremental displacement detector exists and suitable circuit arrangements of a conventional nature responsive to the register output may be utilized to indicate such a position or to provide a suitable control of arrangements associated with a machine tool automation system, for example, for performing a machine or assembly operation on a device, the position of which has been controlled by the system. These and other applications, depending upon the physical conditions, will be readily apparent to those skilled in the art.

It will be appreciated that this invention, providing a control of an oscillator between oscillating and non-oscillating states in dependence of impedance variations of an electrical transducer responsive to physical conditions under investigation, affords an arrangement uniquely adapted to the production of digital types of electrical signals applicable in connection with digital systems for effecting an indication or a control with respect to the physical conditions. The oscillator circuit arrangement provides advantages which are of value in applications of this nature, in that it inheres the function of an oscillator which is usually required to excite systems of this character and thereby combines in a single circuit configuration the function of several types of apparatus required in prior art arrangements. But, more importantly, the oscillator circuit arrangement provides an output having substantially infinite ratio between the two electrical condition states of the circuit, since oscillation is effectively stopped in one electrical state with the arrangement provided. For the purpose of comparison, and as noted hereinabove, the best signal-to-noise ratio obtainable with prior arrangements, after adjustment of the circuit for optimum operation, was of the order of about 10 to 1. This latter ratio poses problems with respect to magnitudes at which the output signals may be clipped and frequently requires intermediate stages of amplification after the filtering, clipping and squaring operations, to obtain the signal energy required to operate other components of the digital system. With the present arrangement, effectively the entire signal range may be employed for control or indication purposes.

Although specific components have been illustrated in the circuit of Fig. 2, and although a specific configuration for position indiction or control has been indicated in Fig. 5, it will be appreciated by those skilled in the art that this invention is not limited as to specific components with regard to either of Figs. 2 and 5, and is not limited as to specific configuration with regard to Fig. 5. In connection with Fig. 2, for example, the transistor type of amplifier may obviously be a vacuum tube type of amplifier. Still further, magnetic amplifying types of devices may be employed in this respect. Similarly, the coupling circuit may take any suitable conventional form and, is not necessarily limited to an arrangement including a bridged-T network, such as herein indicated. Still further, the position of the detector head coil assembly in the bridge circuit need not be that illustrated in Fig. 2, but may be any point in the bridge circuit wherein the impedance variation is effective to control the transmission characteristic of the coupling circuit. These and other expedients of a conventional nature and involving equivalents of the structure and function herein described for accomplishing the results herein considered, will be obvious to those skilled in the art.

What is claimed is:

1. An incremental displacement detector system comprising: a grooved scale of magnetic material, having spaced grooves forming lands therebetween, an electromagnetic member having a coil and a magnetic circuit therefor, said magnetic circuit being magnetically coupled to said grooved scale and being movable relative thereto to traverse said grooves and lands, said magnetic circuit having one reluctance value adjacent to a groove and a second reluctance value adjacent to a land to correspondingly vary the impedance of said coil, a normally conducting direct current amplifier having an input circuit and an output circuit, an impedance network including said coil connecting said output circuit to said input circuit forming an oscillator circuit arranged to oscillate at one impedance state of said coil, and digital circuit means connected to said output circuit to be controlled thereby.

2. Apparatus as set forth in claim 1 wherein said amplifier comprises a transistor.

References Cited in the file of this patent

UNITED STATES PATENTS

| | | |
|---|---|---|
| 1,838,084 | Drake | Dec. 29, 1931 |
| 2,173,427 | Scott | Sept. 19, 1939 |
| 2,764,643 | Sulzer | Sept. 25, 1956 |

FOREIGN PATENTS

| | | |
|---|---|---|
| 741,876 | Germany | Nov. 18, 1943 |
| 563,421 | Great Britain | Aug. 14, 1944 |